(12) United States Patent
Abel et al.

(10) Patent No.: US 10,657,440 B2
(45) Date of Patent: May 19, 2020

(54) OPTICAL SYNAPSE FOR NEUROMORPHIC NETWORKS

(71) Applicant: International Business Machines Corporation, Armonk, NY (US)

(72) Inventors: Stefan Abel, Zurich (CH); Lukas Czomomaz, Zurich (CH); Veeresh V. Deshpande, Zurich (CH); Jean Fompeyrine, Waedenswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1241 days.

(21) Appl. No.: 14/922,292

(22) Filed: Oct. 26, 2015

(65) Prior Publication Data

US 2017/0116514 A1    Apr. 27, 2017

(51) Int. Cl.
*G06N 3/06*    (2006.01)
*G06N 3/067*    (2006.01)

(52) U.S. Cl.
CPC .................................. *G06N 3/0675* (2013.01)

(58) Field of Classification Search
CPC .... G06N 3/0472; G06N 3/063; G06N 3/0675; G06N 3/067
See application file for complete search history.

(56) References Cited

U.S. PATENT DOCUMENTS

| 5,180,911 | A  | * | 1/1993 | Grossman | G01L 1/242 250/227.21 |
| 6,643,627 | B2 | * | 11/2003 | Liaw | G06N 3/049 706/22 |
| 6,823,098 | B2 | * | 11/2004 | Guidotti | G02B 6/3536 385/14 |
| 7,398,259 | B2 | * | 7/2008 | Nugent | G06N 3/08 706/33 |

(Continued)

FOREIGN PATENT DOCUMENTS

| WO | 2010104956 A1 | 9/2010 | |
| WO | WO-2010104956 A1 * | 9/2010 | ............. G06E 3/003 |

OTHER PUBLICATIONS

Ren et al., "Optical Spike-timing-dependent plasticity with weight-dependent learning window and reward modulation", Sep. 17, 2015, Optics Express, vol. 23 No. 19, pp. 1-12 (Year: 2015).*

(Continued)

*Primary Examiner* — Paulinho E Smith
(74) *Attorney, Agent, or Firm* — Cantor Colburn LLP; Daniel Morris

(57) ABSTRACT

A neuromorphic network includes a first node configured to transmit a first optical signal and a second node configured to transmit a second optical signal. A waveguide optically connects the first node to the second node. An integrated optical synapse is located on the waveguide between the first node and the second node, the optical synapse configured to change an optical property based on the first optical signal and the second optical signal such that if a correlation (Continued)

between the first optical signal and the second optical signal is strong, the optical connection between the first node and the second node is increased and if the correlation between the first optical signal and the second optical signal is weak, the optical connection between the first node and the second node is decreased.

11 Claims, 7 Drawing Sheets

(56) References Cited

U.S. PATENT DOCUMENTS

| | | | |
|---|---|---|---|
| 9,020,870 | B1 | 4/2015 | Daily et al. |
| 2002/0181067 | A1* | 12/2002 | Romanovsky ........ G02F 1/0551 359/245 |
| 2012/0296619 | A1 | 11/2012 | Maliassov et al. |
| 2013/0094029 | A1* | 4/2013 | Bienstman ......... G01N 21/7746 356/517 |
| 2015/0009548 | A1* | 1/2015 | Bienstman ................ G02F 3/00 359/107 |
| 2015/0309340 | A1* | 10/2015 | Abel ....................... G02F 1/025 385/2 |
| 2017/0116514 | A1* | 4/2017 | Abel ..................... G06N 3/0675 |
| 2017/0116515 | A1* | 4/2017 | Abel ..................... G06N 3/0445 |
| 2017/0221032 | A1* | 8/2017 | Mazed .................... G16C 99/00 |
| 2018/0211158 | A1* | 7/2018 | Shainline ............. G06N 3/0472 |
| 2018/0217328 | A1* | 8/2018 | Heroux .............. G02B 6/12004 |
| 2018/0246391 | A1* | 8/2018 | Sun ........................ G02F 1/3132 |
| 2019/0065941 | A1* | 2/2019 | Yoo ........................ G06N 3/063 |

OTHER PUBLICATIONS

Behrad et al., "Amorphous Metal-Sulphide Microfibers Enable Photonic Synapses for Brain-Like Computing", May 2015, Advanced Optical Materials,pp. 635-641. (Year: 2015).*

A. Chanthbouala, et al.,"A ferroelectric memristor", Nature Mater, vol. 11, 2012, pp. 1-24.

B. Gholipour, et al.,"Amorphous Metal-Sulphide Microfibers Enable Photonic Synapses for Brain-Like Computing", Advanced Optical Materials, vol. 3, 2015, pp. 1-7.

C.D. Wright et al.,"Arithmetic and Biologically-Inspired Computing Using Phase-Change Materials", Advanced Materials, vol. 23, 2011, pp. 1-6.

K.Vandoorne, et al., "Experimental demonstration of reservoir computing on a silicon photonics chip," Nature communications, Mar. 24, 2014, pp. 1-6.

L. Appeltant, et al.,"Information processing using a single dynamical node as complex system", Nature Communication, Sep. 13, 2011, pp. 1-6.

List of IBM Patents or Patent Applications Treated as Related; CH920150060US1, Date Filed: Oct. 26, 2015, pp. 1-2.

M. P. Fok, et al.,"Pulse lead/lag timing detection for adaptive feedback and control based on optical spike-timing-dependent plasticity", Optic Letters, vol. 38, No. 4, Feb. 15, 2013, pp. 1-3.

M.A. Nahmias, et al.,"A Leaky Integrate-and-Fire Laser Neuron for Ultrafast Cognitive Computing", IEEE, vol. 19, No. 5, Sep./Oct. 2013, pp. 1-12.

S. Abel, et al.,"A strong electro-optically active lead-free ferroelectric integrated on silicon", Nature Communications, Apr. 9, 2013, pp. 1-5.

Stefan Abel, et al.,"Optical Synapse for Neuromorphic Networks", U.S. Appl. No. 14/922,300, filed Oct. 26, 2015.

F. Duport, et al.,"All-optical reservoir computing," Optics Express, vol. 20, No. 20, Sep. 24, 2012, pp. 1-13.

K. Vandoorne, et al.,"Toward optical signal processing using Photonic Reservoir Computing," Optical Society of America, Optics Epress, vol. 16, No. 15, Jul. 21, 2008, pp. 1-11.

* cited by examiner

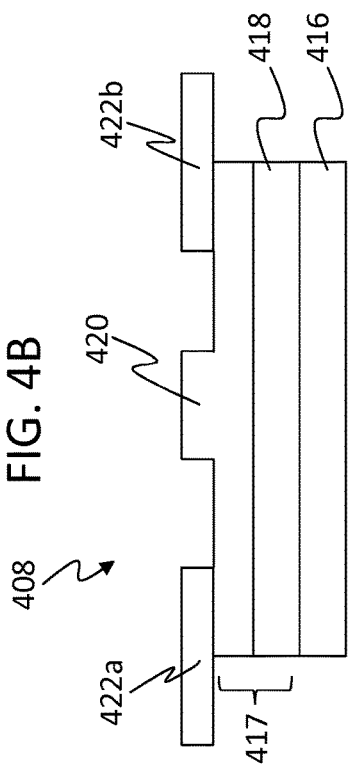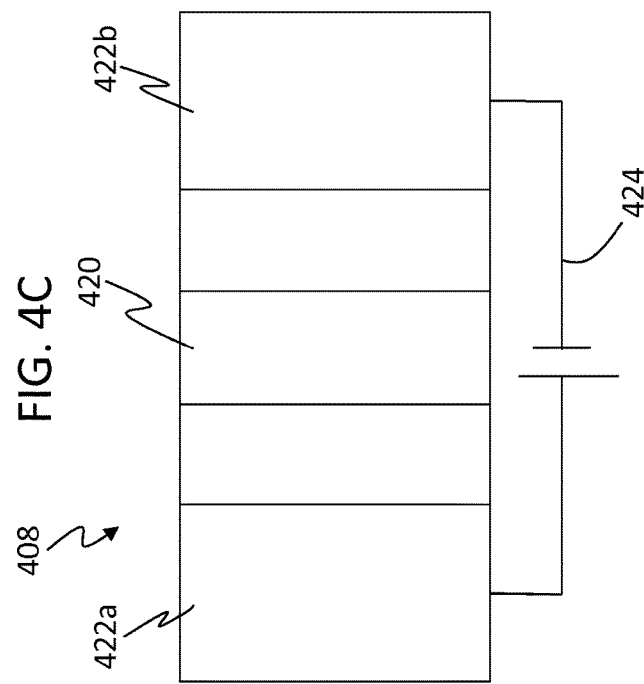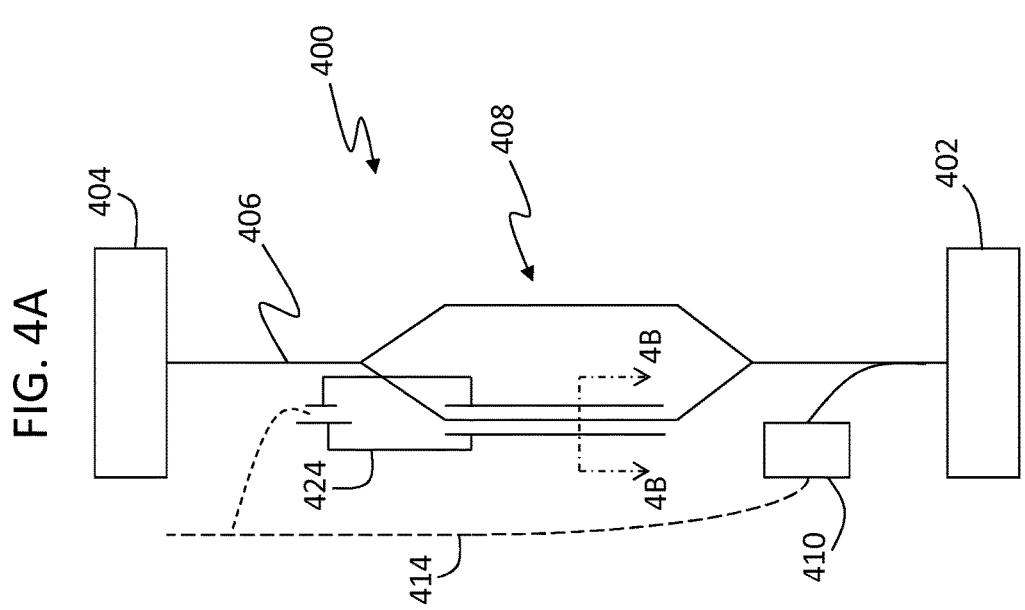

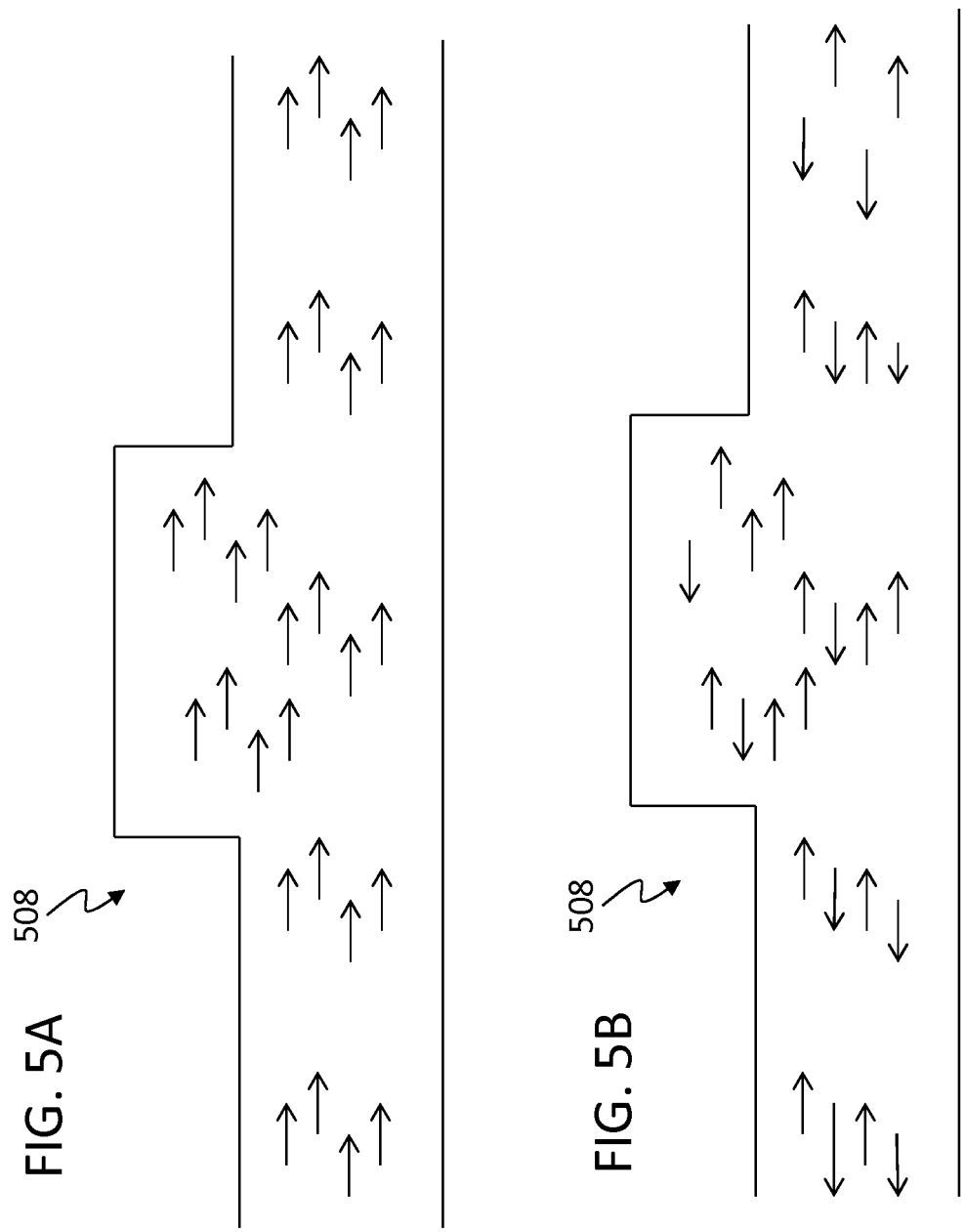

OPTICAL SYNAPSE FOR NEUROMORPHIC NETWORKS

FIELD

This application relates to neuromorphic networks, and in particular, to optical synapses for optical neuromorphic networks.

BACKGROUND

Neuromorphic networks are widely used in pattern recognition and classification, with many potential applications from fingerprint, iris, and face recognition to target acquisition, etc. The parameters (e.g., 'synaptic weights') of the neuromorphic networks are adaptively trained on a set of patterns during a learning process, following which the neuromorphic network is able to recognize or classify patterns of the same kind.

A key component of a neuromorphic network is the 'synapse,' at which weight information is stored, typically as a continuous-valued variable. For applications that would benefit from compact, high-performance, low-power, portable neuromorphic network computation, it is desirable to be able to construct high-density hardware neuromorphic networks having a large number of synapses ($10^9$-$10^{10}$ or more). Currently a neuromorphic network is typically realized as a software algorithm implemented on a general-purpose computer, although hardware for neuromorphic networks exist.

Neuromorphic networks may be used for three broad types of learning. In "supervised learning" a set of (input, desired output) pairs is provided to the neuromorphic network, one at a time, and a learning algorithm finds values of the "weights" (the adjustable parameters of the neuromorphic network) that minimize a measure of the difference between the actual and the desired outputs over the training set. If the neuromorphic network has been well trained, it will then process a novel (previously unseen) input to yield an output that is similar to the desired output for that novel input. That is, the neuromorphic network will have learned certain patterns that relate input to desired output, and generalized this learning to novel inputs.

In "unsupervised learning," a set of inputs (without "desired outputs") is provided to the neuromorphic network, along with a criterion that the neuromorphic network is to optimize. An example of such a criterion is that the neuromorphic network be able to compress an input into a smaller amount of information (a "code") in such a way that the code can be used to reconstruct the input with minimum average error. The resulting "auto-encoder" network consists of, in sequence, an input layer having a number of neurons or nodes, one or more "hidden" layers, a "code" layer (having relatively few neurons or nodes), one or more hidden layers, and an output layer having the same number of neurons or nodes as the input layer. The entire network is trained as if this were a supervised-learning problem, where the "desired output" is defined to be identical to the input itself.

In a third type of learning, "reinforcement learning," a "reward/penalty" value is provided (by an external "teacher"). The "reward/penalty" value depends upon the input and the network's output. This value is used to adjust the weights (and therefore the network's outputs) so as to increase the average "reward."

Neuromorphic network applications may include pattern recognition, classification, and identification of fingerprints, faces, voiceprints, similar portions of text, similar strings of genetic code, etc.; data compression; prediction of the behavior of a systems; feedback control; estimation of missing data; "cleaning" of noisy data; and function approximation or "curve fitting" in high-dimensional spaces.

SUMMARY

A neuromorphic network includes a first node configured to transmit a first optical signal and a second node configured to transmit a second optical signal. A waveguide optically connects the first node to the second node. An integrated optical synapse is located on the waveguide between the first node and the second node, the optical synapse configured to change an optical property based on the first optical signal and the second optical signal such that if a correlation between the first optical signal and the second optical signal is strong, the optical connection between the first node and the second node is increased and if the correlation between the first optical signal and the second optical signal is weak, the optical connection between the first node and the second node is decreased.

BRIEF DESCRIPTION OF THE SEVERAL VIEWS OF THE DRAWINGS

FIG. 3A is a schematic plot of an example voltage pulse from a first node in accordance with an embodiment of the present disclosure;

FIG. 3B is a schematic plot an example voltage pulse from a second node in accordance with an embodiment of the present disclosure;

FIG. 3C is a schematic plot of the voltage pulse of FIG. 3A and the voltage pulse of FIG. 3B, when the first node transmits its pulse before the second node transmits its pulse;

FIG. 3D is a schematic plot of the voltage pulse of FIG. 3A and the voltage pulse of FIG. 3B, when the first node transmits its pulse after the second node transmits its pulse;

FIG. 4A is a schematic illustration of a portion of a neuromorphic network in accordance with an embodiment of the present disclosure;

FIG. 4B is a cross-sectional view of an optical weighting element as indicated by the line 4B-4B shown in FIG. 4A;

FIG. 4C is a top plan view of the optical weighting element of FIG. 4B;

FIG. 5A is a schematic illustration of an optical domain state of an optical weighting element in accordance with the present disclosure;

FIG. 5B is a schematic illustration of another optical domain state of the optical weighting element of FIG. 5A;

DETAILED DESCRIPTION

Figure 1:
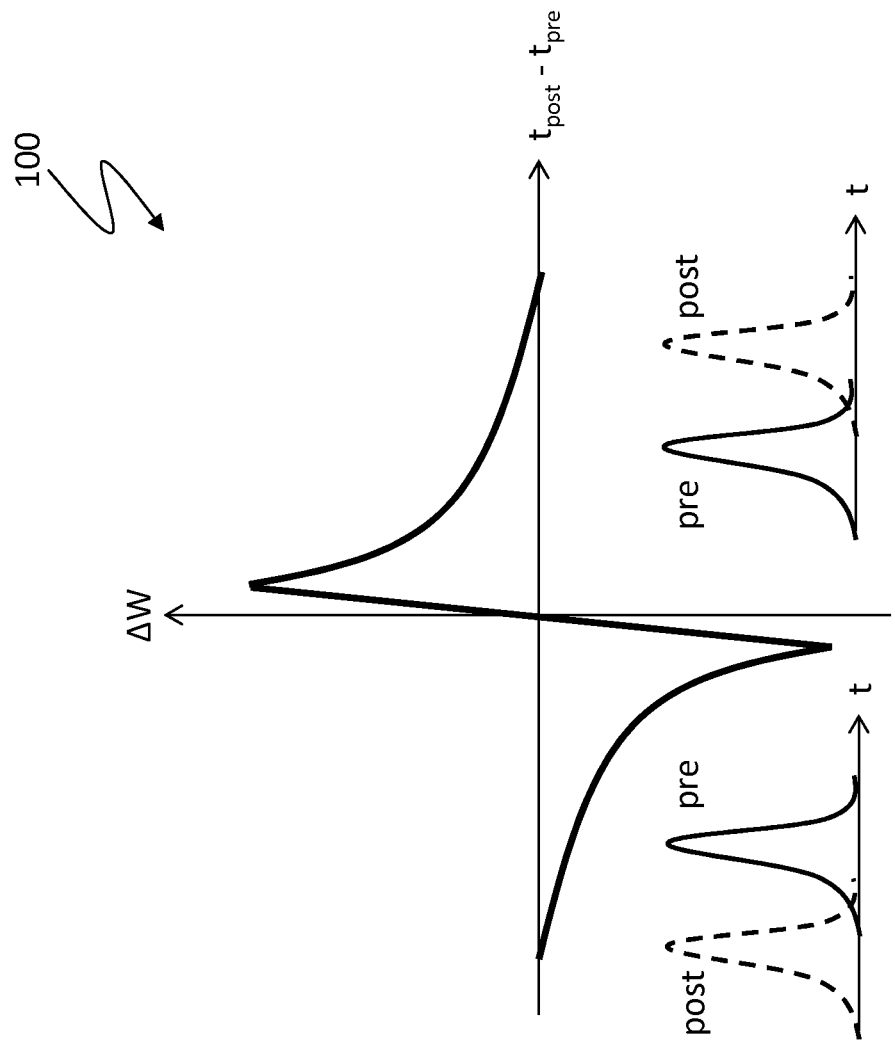
FIG. 1 is a schematic plot of an example of synapse weighting.

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments will be described with reference to the attached drawings.

According to example embodiments, a basic layout of hardware-implemented neuromorphic networks consist of a set of regularly-spaced "x" and "y" lines intersecting at synaptic nodes. A synaptic node may consist of a programmable analog or multilevel resistor, which may preferably be non-volatile. In at least one example embodiment, this functionality may be realized by a phase change material (PCM) device, which, if necessary, may be programmed with feedback. The read/write functionality may be achieved by the presence of compact controller logic units each having 4-5 or more bits, each attached to an "x" and "y" line running along edges of the array of synaptic nodes. The controllers have functionalities including analog-to-digital (A/D) inputs, digital-to-analog (D/A) outputs, storage for several numbers each having 4-5 or more bits, digital I/O lines, and nonlinear sigmoid-type outputs.

For learning, a solution involves using multilevel programming of each synaptic resistance unit, and using the functional capability of the controllers to program the synaptic levels, while maintaining very compact synapse structures (e.g., a PCM element plus one to three transistors, depending upon a desired configuration). For example, using 30 nm technology, a synaptic density of $3.6\times10^9$ cm$^{-2}$ may be achieved, with $6\times10^4$ controllers attached to each x-line and each y-line. The controllers may consist of $10^4$ or more transistors. The energy required per synapse per step (i.e., per weight change) is several pico-Joules (pJ). For each presentation of an input to the neuromorphic network during learning, the desired weight updates at all the synapses may be performed in a time on the order of 0.02 seconds. During the recognition stage (i.e., following synapse training), the energy consumption and recognition time per image may be reduced.

Thus, synapses are a key element in neuromorphic networks. The synapses enable plasticity and/or memory that enables the network to adjust during training, e.g., learning and cognitive behavior. Further, due to the high density achieved in neuromorphic networks, a strong interconnectivity exists between all synaptic nodes. However, as described above, there are limits to the neuromorphic networks due to programmable controllers and electrical control and command at the synaptic level.

In the framework of neuromorphic networks, optical technologies are an attractive way to build spike-based processing units, as they intrinsically provide the low power, high bandwidth, and low latency that is required for spike processing. Different implementations of optical devices and circuits have been proposed to build optical cognitive systems. However, hardware implementations of neuromorphic circuits based on memory devices (popularly known as 'memristors') may have characteristics similar to a biological synapse in terms of its plasticity, where the device I-V characteristics resemble either, LTP/LTD (Long Term Plasticity/Long Term Depression) or STDP (Spike Timing Dependent Plasticity) that are believed to be essential for learning in these systems.

As described herein, a neuromorphic network using optical signals and photonic elements is provided. The interconnection between nodes (neurons) of the neuromorphic network or output nodes are built from devices whose optical transmission can be modified by means of a trigger signal and the modification can act as a 'weighting' element either in direct implementation as synapse (for synaptic plasticity—STDP, LTD, etc.) or as adjustable weights in combination with photonic 'reservoir nodes'.

Turning to FIG. 1, an example of synapse weighting is shown. The plot 100 represents a timing scheme on the horizontal axis and a weighting scheme on the vertical axis. When two nodes communicate in a neuromorphic network, there is a general flow direction such that spikes have a direction for a main flow of information. Between two nodes, a first node may send a first spike and a second node may send a second spike. When the first spike happens before the second spike, it may be inferred that the second spike occurred as a result of the first spike, and thus a correlation may be made between the first node and the second node. Such a scenario is referred to as a pre-post firing, that is, the first spike occurs before the second spike. However, in some instances, the second spike may occur before the first spike, and this is referred to post-pre firing. In such a case, it may be inferred that the first spike is not related to the second spike (or vice versa), and thus a correlation between the two nodes should be reduced and/or the weighting should weakened. By observing the pre-post and post-pre firings, a relationship between the first node and the second node, and the spike firing between the two, may be made.

In spike-timing-dependent plasticity (STDP) the weights of synapses should be adjusted depending on the timing of the pre- and postsynaptic spikes. If a presynaptic spike occurs before a postsynaptic spike, the weighting should be strengthened (long term potentiation (LTP)), which could amount to reduction of the attenuation on signals propagating from pre-neuron to post-neuron. For example, in an electrical case, this is affected by an increase in conductivity of the pre-neuron to post-neuron connection. That is, the relationship or correlation between the first node and the second node should be weighted higher or increased.

However, if a postsynaptic spike occurs before a presynaptic spike, the weighting should be weakened (long-term depression (LTD)). That is, the relationship or correlation between the first node and the second node should be weighted lower because it is unlikely, or impossible, that the postsynaptic spike was triggered by the presynaptic spike due to the time of the events.

Further, as indicated in plot 100, the amount or amplitude of the weighting (positive or negative) may be based on the specific timing. For example, a longer delay between two signals may result in lesser weighting than two signals that are relatively close to each other in time. This is because if two spikes occur far apart (in time) then the correlation between the spikes is significantly lower, and thus a weighting should be applied appropriately. Thus, if a presynaptic spike occurs before a postsynaptic spike and the two spikes occur very close together in time, then a high correlation and weighting is applied. However, if a presynaptic spike occurs before a postsynaptic spike and the two spikes occur with a longer time between the two, the correlation and weighting is less.

Figure 2:
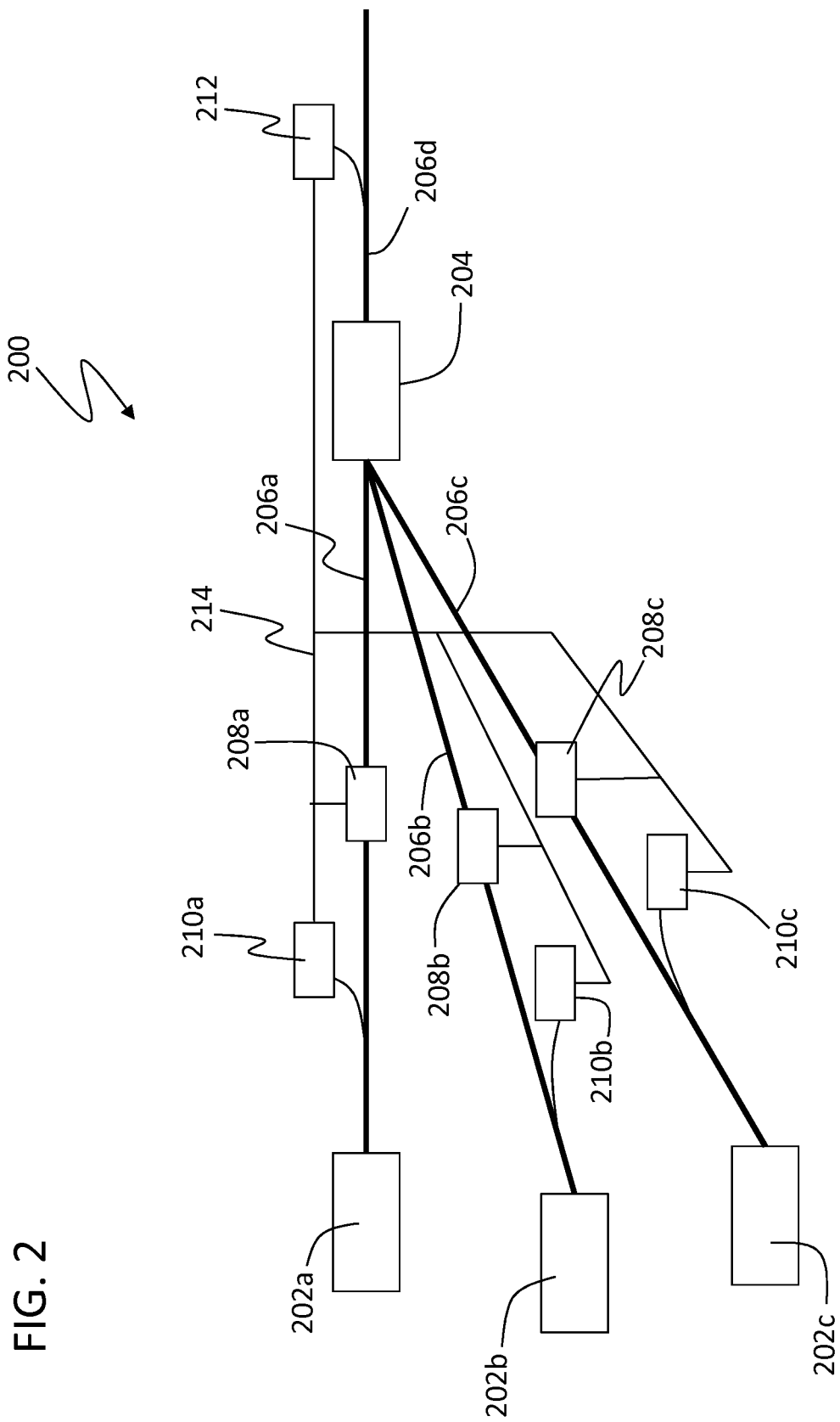
FIG. 2 is a schematic illustration of a neuromorphic network in accordance with an embodiment of the present disclosure.

Turning now to FIG. 2, an example portion of a neuromorphic network 200 is shown. In FIG. 2, a first neuron or node 202a and a second neuron or node 204 are connected via a portion of the waveguide 206a that is upstream of the second node 204 which includes an integrated first optical synapse 208a as described herein. The characteristics of the first optical synapse 208a is that its transmission can permanently change (one-way increase or one-way decrease, or in both directions). The synaptic state will be changed dependent on the time dependence of pre- and postsynaptic (optical) pulses between the first node 202a and the second node 204. The first optical synapse 208a may be configured to control the transmission through the first optical synapse 208a such that light pulses from the first node 202a may be affected, altered, dampened, suppressed, and/or prevented completely, such that the light pulses cannot reach the second node 204. Controlling the optical properties of the synapse is the action of weighting. If the weighting is increased or strengthened, the transmission from the first node 202a to the second node 204 may be permitted or even amplified, but if the weighting is decreased or weakened, the transmission from the first node 202a to the second node 204 may be lessened or prevented entirely.

As shown, a plurality of additional first nodes 202b, 202c, etc. may also be connected to the second node 204 by respective portions of waveguides 206b, 206c, etc., that are upstream of the second node 204 and respective integrated optical synapses 208b, 208c may be configured between the respective first nodes 202b, 202c and the second node 204.

In such a configuration, and in accordance with embodiments described herein, the optical synapses 208a, 208b, 208c can be trained by the neuromorphic network itself during operations. This is in contrast to prior configurations that relied upon external programming and/or biasing. That is, similar to plot 100, the synapses 208a, 208b, 208c can be trained to provide weight adjustments dependent on spike events from the respective nodes (first nodes 202a, 202b, 202c, and second node 204). The optical synapses, as employed herein, may be configured from materials that change optical transmission by electrical and/or optical stimuli, if the stimulus is above a material threshold.

Thus, in accordance with the example embodiment of FIG. 2, first node 202a and second node 204 are connected by the portion of the waveguide 206a that is upstream of the second node 204, with the optical synapse 208a located along the portion of the waveguide 206a that is upstream of the second node 204 and between the first node 202a and the second node 204. The first node 202a may transmit light along the portion of the waveguide 206a that is upstream of the second node 204 toward the second node 204. The light from the first node 202a may be a pre-pulse or presynaptic spike. Similarly, light may be transmitted from the second node 204 along a waveguide 206d that is downstream of the second node 204 (as shown, away from first node 202a), and this may be a post-pulse or postsynaptic spike.

To perform weighting, a first detector 210a may be configured along the portion of the waveguide 206a that is upstream of the second node 204 between the first node 202a and the associated synapse 208a that is located on the same portion of the waveguide 206a. For example, the waveguide 206a may be configured to have a portion of the light pulse from the first node 202a to be diverted or split to the first detector 210a. Similarly, a second detector 212 may be configured downstream from the second node 204 along the waveguide 206d such that a portion of a light pulse from the second node 204 may be diverted or split to the second detector 212. Alternatively, the second detector 212 may be located on a separate feedback path from the second node 204 (i.e., toward it's associated synapse 208a) such that a light pulse is simultaneously sent from the second node 204 in a downstream or forward direction along the waveguide 206d and in the feedback path that connects the second node 204 directly with the detector 212. In such a configuration, the second detector 212 would detect a pulse on the feedback path.

In a further alternative configuration, the feedback of the second node 204 may be sent back, i.e., upstream, toward the first node 202a along the portion of the waveguide 206a that is upstream of the second node 204. An optical splitter may be configured along the waveguide 206a such that a portion of the feedback from the second node 204 is directed to the second detector 212. As will be appreciated by those of skill in the art, the optical splitter may be directional, such that a signal from the first node 202a cannot or only partially reach the second detector 212. In some embodiments, the light pulse from the second node 204 may be affected, altered, dampened, suppressed, and/or prevented completely from transmitting to the first node 202a, for example by a directional coupler which can be used as a splitter between the synapse 208a and the second node 204. As will be appreciated by those of skill in the art, in some embodiments and/or configurations, a fraction of the light pulse from the second node 204 may reach the first node 202a, but such impact on the first node 202a may be negligible.

The first detector 210a and the second detector 212 may be electrically connected to the first synapse 208a by an electrical connection 214. Each detector 210a and 212 may output a signal, and the signals may be combined, such as summing, and an electrical signal, pulse, or spike, may be sent to the first optical synapse 208a. Depending on the pulse shape and delay time between both pulses from the respective nodes 202a, 204 (as detected by the first detector 210a and the second detector 212, respectively) a voltage pulse along the electrical connection 214 may be transmitted to the first optical synapse 208a. The voltage received by the optical synapse 208a may cause a change in the optical transmission of the first optical synapse 208a. As such, the voltage is used to perform an active weighting on the synapse, and the neuromorphic network 200 may learn which nodes have connections with which other nodes. Accordingly, active, live learning by the neuromorphic network may be performed, without the need to provide external programming and/or biasing.

In one non-limiting example, parts of the light emitted by the pre-synaptic neuron (first node 202a) is split from the waveguide 206a and fed to an associated first detector 210a which converts the optical pulse to an electrical pulse. A post-synaptic pulse, from the second node 204, is fed to an associated second detector 212. Both detectors 210a, 212 emit an electric pulse that is asymmetric in time and that will be combined (e.g. summed, differentiated, etc.). Depending on the arrival time of both optical pulses, the magnitude of the sum of both electrical pulses changes. The sum of the electric pulses is fed to the optical synapse 208a. If the pulse voltage is above a certain threshold, the optical properties of the optical synapse 208a might change. One example of such changing behavior would be the modification of a ferroelectric domain state in an optical nonlinear material embedded in the waveguide 206a as the optical synapse 208a (e.g., barium titanate). Depending on the domain state of optical synapse 208a, the transmission of the waveguide 206a might vary (for example when embedded in a Mach-Zehnder waveguide structure).

As will be appreciated by those of skill in the art, the above described process may occur for each of the first nodes 208a, 208b, 208c. As the weighting is performed, the first node 208a, 208b, 208c that has the highest correlation with the second node 204 will become the dominant first node for sending light pulses to the second node, and the other first nodes will be prevented or impeded from transmitting optical pulses to the second node, thus building a highly correlated neuromorphic network. Those of skill in the art will appreciate that more than one first node may be configured to one or more second nodes, and the above description is not intended to be limiting.

This may be repeated for many first nodes and many second nodes, and for interconnections between such nodes. As the process continues, the strongest correlation communications will be enabled and strengthened whereas the weakest correlations will be weakened and disabled or prevented. As a result, a robust and self-taught neuromorphic network will form.

Turning now to FIGS. 3A-3D, various examples of pulse shapes for enabling STDP in a neuromorphic network in accordance with embodiments disclosed herein are shown. The pulse shapes may be representative of the voltage or current pulses sent from the detectors to the synapses (e.g., as shown in FIG. 2), and thus such pulses may be used to alter the optical properties of the synapses and enable and perform the weighting of the neuromorphic network and the node connections thereof. In FIGS. 3A-3D, a particular example for a case of voltage pulses is shown. In each of FIGS. 3A-3D, the vertical axis is voltage and the horizontal axis is time.

FIG. 3A is a representative pre-synaptic pulse 301. That is, FIG. 3A represents, for example, a pulse that may be output from the first detector 210a that detected a light pulse from the first node 202a.

FIG. 3B is a representative post-synaptic pulse 303. That is, FIG. 3B represents, for example, a pulse that may be output from the second detector 212 that detected a light pulse from the second node 204.

FIG. 3C is a representation of a pre-before-post summation that is supplied to the optical synapse located between the two nodes at issue. As shown, there is an overlap of positive voltages. This may result in a large positive value of the sum 305 of both pulses 301, 303. If the sum 305 is above a threshold (positive) voltage value 307, potentiation of synaptic weight occurs (i.e., increase in weight).

FIG. 3D is a representation of a post-before-pre summation that is supplied to the optical synapse located between the two nodes at issue. As shown, there is an overlap of negative voltages. This may result in a large negative value of the sum 309 of both pulses 301, 303. If the sum 309 is above a threshold (negative) voltage value 311, depression of synaptic weight occurs (i.e., decrease in weight).

The summed pulses (e.g., sums 305, 309 of FIGS. 3C and 3D, respectively), when above the threshold values (e.g., thresholds 307, 311 of FIGS. 3C and 3D, respectively) for the material of the synapses, will cause a change in the material properties of the synapses. Thus, the weighting process can change the optical properties of the synapses and perform an unassisted and automatic weighting operation. The shape and magnitude of the voltage pulses in FIGS. 3A-3D are one example of pulses, and those of skill in the art will appreciate that other various pulse shapes can be used based on the material properties of a material used in the optical synapses. As will be appreciated by those of skill in the art, based on the composition, material, etc. of the synapses and/or waveguides of a specific configuration, no changes or minor and/or negligible changes may occur if a pulse is received that is below the threshold of the material.

Turning now to FIGS. 4A-4C, various schematic views of one non-limiting example implementation of plasticity in the optical domain of a neuromorphic network is shown. Such plasticity in the optical domain may enable the ability to adjust for weighting, such as based on voltage pulses as shown and described in FIGS. 3A-3D.

Referring to FIG. 4A, a schematic illustration of a portion of a neuromorphic network 400 is shown. A first node 402 is optically connected to a second node 404 by a Mach-Zehnder waveguide 406. An optical detector 410 is optically connected to the first node 402 and is configured to receive a portion of a light pulse that is transmitted from the first node 402. In some embodiments, the connection of the detector to the node may be by, for example, a directional coupler or a multi-mode interferometer (MMI). The optical detector 410 is configured to convert a received light pulse from the first node 402 into an electrical signal or pulse, which is then transmitted along an electrical connection 414 and is received by an optical weighting element 408, including both arms of the interferometer. The optical weighting element 408 may be configured and referred to herein as an optical weighting element. Although not shown, a second optical detector may be configured downstream of the second node 404, and signals from the optical detector 410 and the second optical detector may be used to influence and control the optical weighting element 408.

Referring to FIG. 4B, a cross-sectional view of the optical weighting element 408 is shown, as viewed along the line 4B-4B shown in FIG. 4A. FIG. 4C is a top plan view of the optical weighting element 408 of FIG. 4B. As shown, the optical weighting element 408 includes a substrate 416 with an optical weighting layer 417 disposed thereon. In the example embodiment of FIG. 4B, the optical weighting layer 417 includes a first layer 418 and a second layer 420 disposed on the substrate 416. In some embodiments, the first layer 418 may be a silicon layer and the second layer 420 may be a ferroelectric layer. Disposed on the optical weighting layer 417, such as on the second layer 420 and electrically connected thereto, is a first electrode 422a and a second electrode 422b. The first electrode 422a and the second electrode 422b are electrically connected by an electrical circuit 424 which is electrically connected to the electrical connection 414, as shown schematically in FIG. 4A. As will be appreciated by those of skill in the art, the cross-sectional views show a waveguide structure, which supports at least one optical mode that is laterally confined within the plane shown in FIG. 4B, and which can propagate parallel to the substrate 416. The substrate 416 may be a silicon-on-insulator (SOI) wafer. Further, as will be appreciated by those of skill in the art, although the embodiment shown in FIG. 4 has first and second layers, the optical weighting element may include any number of layers, and is not limited to the embodiment shown, and in some embodiments, various layers may be configured between the first and second layers and/or between the second layer and the electrodes. Further, various materials may be used, other than silicon, such as III-V semiconductor materials, although not limited thereto.

In operation and configured as an optical weighting element of a neuromorphic network, the optical weighting element 408 changes its optical properties or weight by electrical or optical stimuli, if the stimuli is above a predetermined threshold. The threshold may be selected based on the selection of the material of the layers of the optical weighting element 408.

For example, the optical weighting element 408 may be part of a Mach-Zehnder waveguide with ferroelectric material with strong Pockels effect. Such a configuration, with a strong Pockels effect, allows for a linear electro-optic effect, where the refractive index of the medium is modified in proportion to an applied electric field strength. Thus, the electrical field can change the domain configuration of the optical weighting element 408.

As shown in FIG. 4A, the optical weighting element 408 may be configured on one arm of the Mach-Zehnder waveguide 406. Short pulses received from the electrical connection 414 can change the domain configuration of the optical weighting element 408 in one arm of the Mach-Zehnder waveguide 406. As will be appreciated, a change of domain configuration can be expressed by a change of the effective Pockels coefficient of the material 420. An optical phase shift in one arm, when applying a static bias, will result in a change of the Mach-Zehnder-transmission.

Turning now to FIGS. 5A and 5B, schematic illustrations of a ferroelectric domain state of an optical weighting element 508 as described herein are shown. FIG. 5A shows a ferroelectric domain state of the optical weighting element 508 prior to receiving a pulse from a detector, as described above. FIG. 5B shows the ferroelectric domain state of an optical weighting element 508 after receiving a pulse from a detector, as described above. As shown, the domain changes after receiving a pulse, as indicated by the arrows in FIGS. 5A and 5B, i.e., the arrows indicate the orientation of the ferroelectric polarization of the domains. The change in the domain will affect the optical properties of the optical weighting element 508, thus allowing weighting of the connections between two nodes, e.g., first node 402 and second node 404 shown in FIG. 4A.

As another example, optical weighting elements as disclosed herein may be modified electrical pulses triggering a phase change in an optical material of the optical weighting element. The physical configuration may be similar to that shown and described with respect to FIGS. 5A-5C, but the physical effect in the material would correspond to a phase change material rather than an optical phase shift, as described above.

Figure 6:
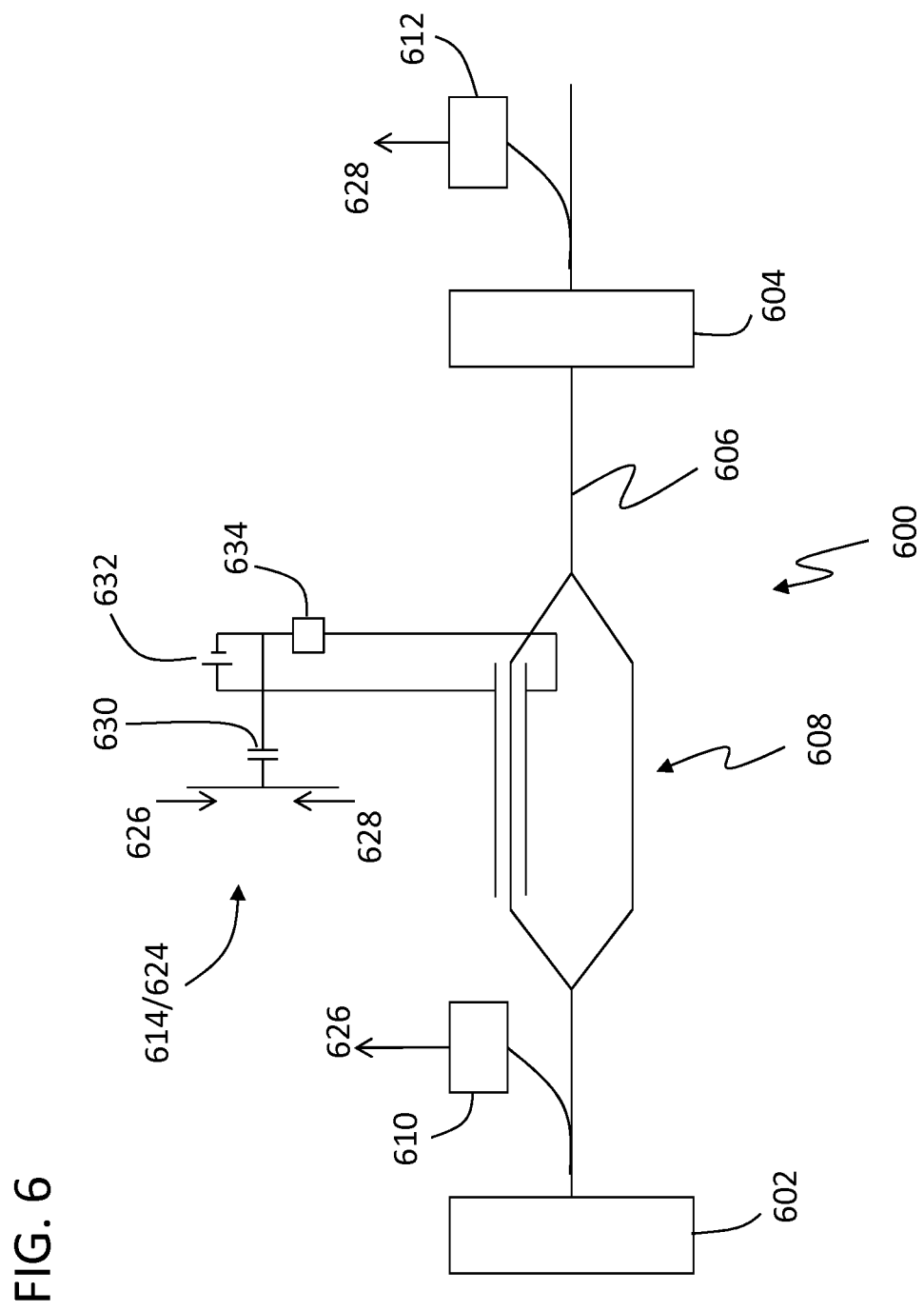
FIG. 6 is a schematic illustration of a portion of a neuromorphic network in accordance with an embodiment of the present disclosure.

Turning to FIG. 6, another non-limiting example of a portion of a neuromorphic network 600 in accordance with the present disclosure is shown. The neuromorphic network 600 may be configured similar to that described above. For example, as shown, a first node 602 may be in optical communication with a second node 604. A waveguide 606 may be disposed between the first node 602 and the second node 604 and have an optical weighting element 608 located thereon. In some embodiments, the optical weighting element 608 may be configured as a Mach-Zehnder waveguide configuration, but other structures may be used, including but not limited to interferometers, optical micro-ring resonators, or any other optical cavity where the transmission of the structure can be modulated by the optical weighting element 608. A first optical detector 610 may be configured to receive a portion of a light pulse from the first node 602 and a second optical detector 612 may be configured to receive a portion of a light pulse from the second node 604. As noted above, other configurations are possible. For example, the pulse from the second node 604 may be directed back (upstream) along the waveguide 606 and be directed to a second optical detector 612.

The first detector 610 may transmit a first detector pulse 626 over an electrical connection 614 having an electrical circuit 624 thereon. Similarly, the second detector 612 may transmit a second detector pulse 628 over the electrical connection 614 to the electrical circuit 624. As shown, the electrical circuit 624 may include a capacitor 630, a constant bias 632, and a memristor or voltage divider 634. Electrical pulses 626, 628 from the first detector 610 and the second detector 612, respectively, may trigger a change of the resistance of the memristor 634. This change causes a change in the voltage drop of the voltage source 632 between the memristor and the optical weighting element 608. The altered voltage drop over the optical weighting element 608 leads to a variation of the refractive index and thus a variation of the transmission. Such configuration may be used with non-linear optical material in the optical weighting element 608, and thus active, self-taught learning of the neuromorphic network 600 may be achieved.

Figure 7:
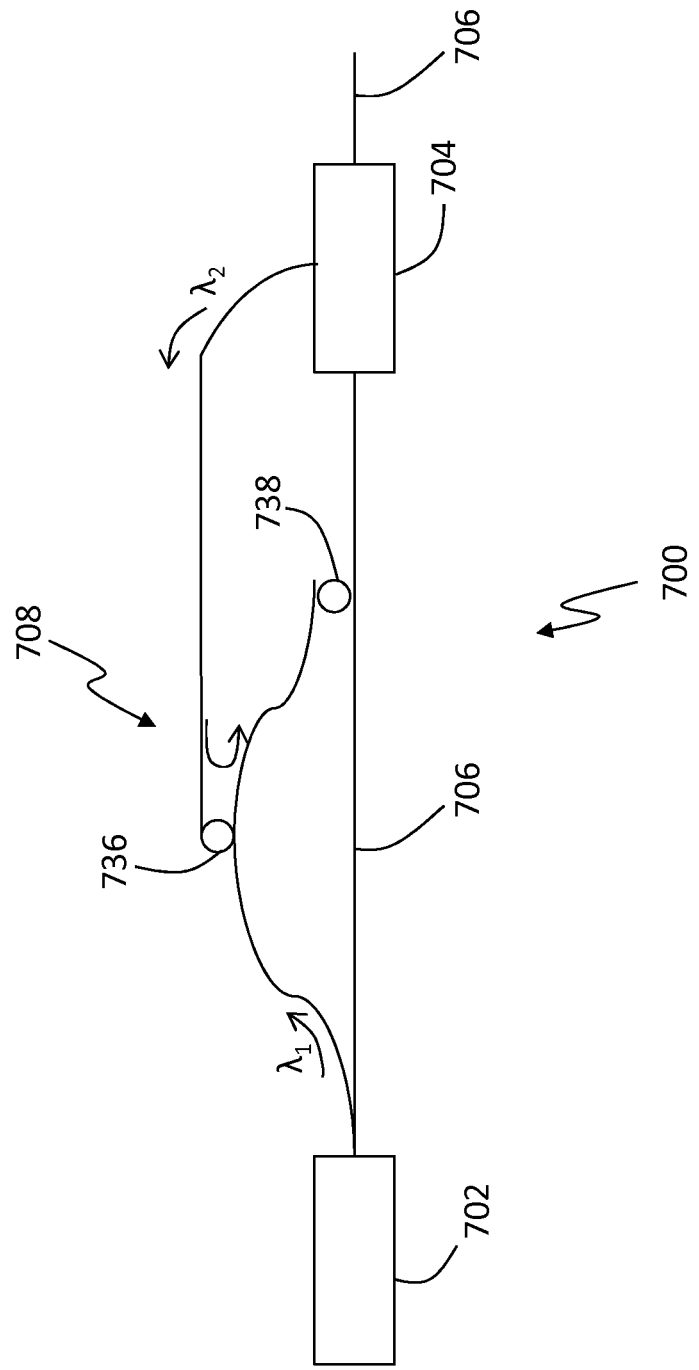
FIG. 7 is a schematic illustration of a portion of a neuromorphic network in accordance with an embodiment of the present disclosure.

Turning now to FIG. 7, another non-limiting embodiment of a portion of a neuromorphic network 700 in accordance with the present disclosure is shown. In the configuration of FIG. 7, the neuromorphic network 700 includes a first node 702 optically connected to a second node 704 by a waveguide 706. In this embodiment, an optical weighting element 708 is configured to be operated entirely using optical signals, unlike the other embodiments described above that convert an optical signal to an electrical signal to perform the optical weighting.

In this embodiment, a portion of a pulse transmitted by the first node 702 is diverted to a first optical cavity 736. That is, the first node 702 emits a first optical pulse at a first wavelength $\lambda_1$ that is split into two paths. A first portion of the first optical pulse from the first node 702 may flow along the waveguide 706 to the second node 704, with this flow path having a resonant structure such as a second optical cavity 738 which may be off-resonance to the first wavelength $\lambda_1$. A second portion of the first optical pulse from the first node 702 may flow to the first optical cavity 736 that is configured on-resonance with the first wavelength $\lambda_1$. The resonance will be shifted if the pulse arrived due to free carrier absorption, the thermo-optic effect due to heating of the cavity, or other nonlinear effects such as the Kerr effect, as known in the art. The physical effect is volatile, and thus the shift of the resonance may only occur for a limited time scale when the optical pulse is present in the cavity. The time scale is mainly determined by the duration of the pulse, the quality of the cavity, and the decay time of the physical effect (such as carrier lifetime or thermal diffusion rates).

Similarly, the second node 704 emits a second optical pulse having a second wavelength $\lambda_2$. The second optical pulse may be split into two paths, with a portion of the second optical pulse being routed to the first optical cavity 736. The second optical pulse having wavelength $\lambda_2$ may be on-resonance to a shifted first cavity spectrum and thus the second optical pulse having the second wavelength $\lambda_2$ may be routed toward the second cavity 738 only if a portion of the first optical pulse having the first wavelength $\lambda_1$ is present in the first optical cavity 736. Although shown with the output from the second node 704 being two separate paths, those of skill in the art will appreciate that the split may occur along the waveguide 706 downstream or upstream of the second node 704, similar to that shown in the prior embodiments. In such configurations, a splitter may be used to route a pulse having the second wavelength $\lambda_2$ from the waveguide toward the first optical cavity 736.

Because the second cavity 738 is configured to be on-resonance with the second wavelength $\lambda_2$, the second optical pulse with the second wavelength $\lambda_2$ may result in a strong light enhancement in the second cavity 738. The strong light enhancement in the second cavity 738 may enable a change of material properties of the optical weighting element 708 due to the high optical power from the second optical pulse having the second wavelength $\lambda_2$ in the second optical cavity 738. Such changes may be a result of a phase transition, a photorefractive effect, etc. This can change the transmission spectrum of the optical weighting element 708, with the change ranging from a short, temporary change to a permanent change. For example, the change of the properties of the cavity may have a decay time that ranges from infinity (e.g., permanent) to very short periods (e.g., on the order of nanoseconds or shorter). This may result in a change in the transmission of the first optical pulse from the first node 702 along the waveguide 706. That is, a change in weight between the first node 702 and the second node 704 may result.

In view of the above discussion and accompanying drawings, a neuromorphic network may be configured to have plasticity built directly into the network, and thus have self-training synapses. Materials that may be used for the synapses described herein may include photorefractive materials (e.g., $BaTiO_3$, $LiNbO_3$, $Pb[Zr_xTi_{1-x}]O_3$, etc.), non-linear materials (e.g., $BaTiO_3$, $KNbO_3$, $LiNbO_3$, $LiIO_3$, AlN, Si, etc.), phase change materials (e.g., TiN, GeSbTe [GST], $VO_2$), magneto-optical materials (e.g., Garnets (such as $Y_3Fe_5O_{12}$), etc.), or any other materials that may be changeable to optical signals.

Further, the triggering of the optical changes, i.e., the weighting, may be performed or achieved in a variety of manners. For example, the weighting may be all-optical, such as photorefractive or phase change based on temperature. In other embodiments, electrical pulses, magnetic fields, or other techniques may be used. For example, in a trough electrical domain the detectors described herein may provide electrical feedback to perform the weighting, as described above.

A benefit of the present disclosure includes a self-training synapse that has no external programming or other external influence. The synapse is configured and constructed to learn from optical spike events between two nodes, and can automatically adjust a material property to provide weighting in the connection between the nodes. Further benefits include on-chip photonic implementations of synaptic elements and an ability to build 'learning photonic circuits' based on synaptic plasticity rules in an integrated circuit. Further, long term depression and potentiation is enabled in the optical domain.

Note that variations may be made on the above example embodiments; the example embodiments are intended to cover all such modifications, equivalents, and alternatives falling within the scope of the example embodiments. For example, many nodes may be configured with synapses described herein located on communication lines between each pair or any two nodes in the group of nodes.

While the invention is described with reference to example embodiments, it will be understood by those skilled in the art that various changes may be made and equivalence may be substituted for elements thereof without departing from the scope of the description. In addition, many modifications may be made to the teachings herein to adapt to a particular situation without departing from the scope thereof. Therefore, it is intended that the description and claims not be limited the embodiments disclosed for carrying out the above described features, but that the disclosure and description includes all embodiments falling with the scope of the appended claims. Moreover, the use of the terms first, second, etc. does not denote any order of importance, but rather the terms first, second, etc. are used to distinguish one element from another.

What is claimed is:

1. A neuromorphic network, comprising:
   a first node configured to transmit a first optical signal;
   a second node configured to transmit a second optical signal;
   a waveguide optically connecting the first node to the second node; and
   an integrated optical synapse located on the waveguide between the first node and the second node, the optical synapse comprising an optical property that is configured to change a strength of an optical connection between the first node and the second node based on a correlation between the first optical signal and the second optical signal; and
   a first detector configured to receive a portion of the first optical signal and a second detector configured to receive a portion of the second optical signal, wherein the first detector and the second detector are configured to transmit signals to the optical synapse such that the optical property of the optical synapse changes based on the signals from the first detector and the second detector,
   wherein based on a determination that the correlation is strong, the strength of the optical connection between the first node and the second node is increased and based on a determination that the correlation is weak, the strength of the optical connection between the first node and the second node is decreased.

2. The neuromorphic network of claim 1, further comprising:
   a first optical cavity configured to receive a portion of the first optical signal and a portion of the second optical signal, wherein the first optical cavity is configured to change the optical property of the optical synapse based on the presence of a portion of the first optical signal in the first optical cavity; and
   a second optical cavity configured to receive a portion of the first optical signal and a portion of the second optical signal when the first optical cavity contains a portion of the first optical signal, wherein the second optical cavity is configured to change the optical property of the optical synapse based on the presence of a portion of the second optical signal in the second optical cavity.

3. The neuromorphic network of claim 1, further comprising an electrical circuit in electrical communication with the optical synapse, the electrical circuit configured to provide an electrical signal to the optical synapse based on the first optical signal and the second optical signal.

4. The neuromorphic network of claim 3, wherein the electrical circuit comprises a capacitor, a constant bias, and a voltage divider.

5. The neuromorphic network of claim 1, wherein the optical synapse is formed from at least one of a photorefractive material, an optical nonlinear material, a phase change material, or a magneto-optical material.

6. The neuromorphic network of claim 1, further comprising a third node, the third node configured in optical communication with the second node along a second waveguide.

7. The neuromorphic network of claim 6, further comprising a second optical synapse configured along the second waveguide, the second optical synapse configured to change an optical property based on a signal from the third node and the second optical signal such that if a second correlation between the signal from the third node and the second optical signal is strong, the strength of the optical connection between the third node and the second node is increased and if the correlation between the signal from the third node and the second optical signal is weak, the strength of the optical connection between the third node and the second node is decreased.

8. The neuromorphic network of claim 1, wherein the correlation between the first optical signal and the second optical signal is based on at least one of the time order of when each signal is fired and the duration between one of the optical signals firing and the other of the optical signals firing.

9. The neuromorphic network of claim 1, wherein the optical synapse is configured to change optical properties when a signal that incorporates the first optical signal and the second optical signal exceeds a predetermined threshold.

10. The neuromorphic network of claim 1, wherein the optical synapse changes properties based on one of an electrical stimulus or an optical stimulus.

11. An optical synapse for a neuromorphic network, the optical synapse comprising:
a first optical cavity configured to receive a portion of a first optical signal from a first node of the neuromorphic network and a portion of a second optical signal from a second node of the neuromorphic network; and
a second optical cavity configured to receive a portion of the first optical signal and a portion of the second optical signal,
wherein the second optical cavity is configured to change an optical property of the optical synapse based on the presence of a portion of the second optical signal in the second optical cavity.

* * * * *